United States Patent
Wang

(10) Patent No.: US 10,114,140 B2
(45) Date of Patent: Oct. 30, 2018

(54) APPARATUS AND METHOD FOR MICRORESISTIVITY IMAGING IN WHICH TRANSMITTER COIL AND RECEIVER COIL AXES ARE SUBSTANTIALLY PERPENDICULAR TO THE LONGITUDINAL AXIS OF THE TOOL BODY

(75) Inventor: Tsili Wang, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1258 days.

(21) Appl. No.: 13/819,122

(22) PCT Filed: Aug. 26, 2011

(86) PCT No.: PCT/US2011/049273
§ 371 (c)(1),
(2), (4) Date: May 13, 2013

(87) PCT Pub. No.: WO2012/027630
PCT Pub. Date: Mar. 1, 2012

(65) Prior Publication Data
US 2013/0234717 A1  Sep. 12, 2013

Related U.S. Application Data

(60) Provisional application No. 61/377,162, filed on Aug. 26, 2010.

(51) Int. Cl.
*G01V 3/10* (2006.01)
*G01V 3/28* (2006.01)

(52) U.S. Cl.
CPC . *G01V 3/10* (2013.01); *G01V 3/28* (2013.01)

(58) Field of Classification Search
CPC .................................. G01V 3/10; G01V 3/28
(Continued)

(56) References Cited

U.S. PATENT DOCUMENTS 2,411,696 A * 11/1946 Silverman ............. E21B 47/122
175/50
3,305,771 A    2/1967 Arps
(Continued)

FOREIGN PATENT DOCUMENTS

CN         1764851 A    4/2006

OTHER PUBLICATIONS

International Search Report for PCT Application Serial No. PCT/US2011/049273 dated Apr. 13, 2012.
(Continued)

*Primary Examiner* — Jay Patidar

(57) ABSTRACT

A microresistivity logging tool and method for making microresistivity measurements, of which the tool includes a logging tool body having a longitudinal axis, a transmitter coil deployed in the tool body, the transmitter coil including an electrical conductor wound about a magnetically permeable core, the electrical conductor being connected to a high frequency alternating current generator deployed in the tool body, a receiver coil deployed in the tool body and including an electrical conductor wound about a magnetically permeable core, the electrical conductor being connected to a high frequency alternating voltage sensor deployed in the tool body. The transmitter and receiver coils each define a coil axis that is substantially perpendicular to the longitudinal axis of the tool body. The receiver coil and the transmitter coil are coaxial and deployed in the same plane.

13 Claims, 4 Drawing Sheets

(58) Field of Classification Search
USPC .................................................. 324/339, 343
See application file for complete search history.

(56) References Cited

U.S. PATENT DOCUMENTS

| | | | |
|---|---|---|---|
| 3,408,561 A | 10/1968 | Redwine et al. | |
| 3,510,757 A * | 5/1970 | Huston | E21B 47/026 |
| | | | 324/343 |
| 4,511,843 A * | 4/1985 | Thoraval | H01Q 1/38 |
| | | | 324/338 |
| 4,845,433 A | 7/1989 | Kleinberg et al. | |
| 5,200,705 A | 4/1993 | Clark et al. | |
| 5,235,285 A * | 8/1993 | Clark | E21B 17/1078 |
| | | | 324/342 |
| 5,235,705 A | 8/1993 | Belisle | |
| 5,339,036 A | 8/1994 | Clark et al. | |
| 5,339,037 A | 8/1994 | Bonner et al. | |
| 5,473,158 A | 12/1995 | Holenka et al. | |
| 6,100,696 A * | 8/2000 | Sinclair | G01V 3/28 |
| | | | 324/338 |
| 6,188,222 B1 * | 2/2001 | Seydoux | E21B 47/12 |
| | | | 175/50 |
| 6,191,588 B1 | 2/2001 | Chen | |
| 6,359,438 B1 | 3/2002 | Bittar | |
| 6,373,254 B1 | 4/2002 | Dion et al. | |
| 6,600,321 B2 | 7/2003 | Evans | |
| 6,714,014 B2 | 3/2004 | Evans et al. | |
| 6,891,377 B2 | 5/2005 | Cheung et al. | |
| 7,027,926 B2 | 4/2006 | Haugland | |
| 7,066,282 B2 | 6/2006 | Chen et al. | |
| 7,098,664 B2 | 8/2006 | Bittar et al. | |
| 7,242,194 B2 | 7/2007 | Hayman et al. | |
| 7,265,553 B2 | 9/2007 | Cheung et al. | |
| 7,346,184 B1 | 3/2008 | Moore | |
| 7,414,407 B2 * | 8/2008 | Wang | G01V 3/28 |
| | | | 324/338 |
| 7,436,183 B2 * | 10/2008 | Clark | E21B 47/122 |
| | | | 324/338 |
| 7,554,328 B2 * | 6/2009 | Wang | G01V 3/28 |
| | | | 324/339 |
| 7,558,675 B2 | 7/2009 | Sugiura | |
| 7,719,282 B2 | 5/2010 | Fanini et al. | |
| 8,669,765 B2 * | 3/2014 | Maurer | G01V 3/28 |
| | | | 324/338 |
| 8,838,389 B2 * | 9/2014 | Sinclair | G01V 99/00 |
| | | | 324/338 |
| 2003/0016020 A1 * | 1/2003 | Gianzero | E21B 49/00 |
| | | | 324/342 |
| 2003/0184304 A1 * | 10/2003 | Homan | G01V 3/28 |
| | | | 324/343 |
| 2004/0100263 A1 | 5/2004 | Fanini et al. | |
| 2005/0218898 A1 * | 10/2005 | Fredette | G01V 3/30 |
| | | | 324/342 |
| 2005/0242819 A1 | 11/2005 | Gold et al. | |
| 2006/0155471 A1 * | 7/2006 | Tabarovsky | G01V 3/28 |
| | | | 702/6 |
| 2006/0208738 A1 * | 9/2006 | Moore | G01V 3/24 |
| | | | 324/344 |
| 2007/0257679 A1 * | 11/2007 | Fanini | G01V 3/28 |
| | | | 324/366 |
| 2008/0033654 A1 * | 2/2008 | Bespalov | G01V 3/28 |
| | | | 702/7 |
| 2009/0179647 A1 * | 7/2009 | Wang | G01V 3/28 |
| | | | 324/339 |
| 2010/0117855 A1 | 5/2010 | Sinclair et al. | |
| 2011/0156709 A1 * | 6/2011 | Wang | G01V 3/24 |
| | | | 324/366 |
| 2011/0156711 A1 * | 6/2011 | Wang | G01V 3/24 |
| | | | 324/369 |
| 2011/0161009 A1 | 6/2011 | Wang | |
| 2013/0144530 A1 * | 6/2013 | Bittar | G01V 3/28 |
| | | | 702/7 |

OTHER PUBLICATIONS

Office Action issued in MX/A/2013/002220 dated May 16, 2014, 6 pages.
Office Action issued in MX/A/2013/002220 dated Oct. 3, 2014, 7 pages.
Office Action issued in CN201180042883.7 dated Feb. 27, 2015, 19 pages.
Office Action issued in MX/A/2013/002220 dated Feb. 20, 2015, 7 pages.
Examination Report issued in GB1302865.9 dated Apr. 28, 2015, 3 pages.
Office Action issued in MX/A/2013/002220 dated Jul. 23, 2015, 5 pages.
Examination Report issued in GB1302865.9 dated Aug. 10, 2015, 2 pages.
Office action issued in the related CN application 201180042883.7, dated Jan. 13, 2016 (7 pages).
International Preliminary Report on Patentability issued in the related PCT application PCT/US2011/049273, dated Feb. 26, 2013 (7 pages).

* cited by examiner

APPARATUS AND METHOD FOR MICRORESISTIVITY IMAGING IN WHICH TRANSMITTER COIL AND RECEIVER COIL AXES ARE SUBSTANTIALLY PERPENDICULAR TO THE LONGITUDINAL AXIS OF THE TOOL BODY

RELATED APPLICATIONS

This application claims the benefit of: U.S. Provisional Application Ser. No. 61/377,162 filed Aug. 26, 2010 and entitled Apparatus and Method for Microresistivity Imaging in Non-Conducting Mud.

FIELD OF THE INVENTION

The present invention relates generally to microresistivity logging measurements. More particularly, embodiments of the invention relate to a logging while drilling tool suitable for making microresistivity measurements non-conductive drilling fluids.

BACKGROUND OF THE INVENTION

The use of electrical measurements in prior art downhole applications, such as logging while drilling (LWD) and wireline logging applications, is well known. Such techniques may be utilized, for example, to determine a subterranean formation resistivity, which, along with formation porosity measurements, may be used to indicate the presence of hydrocarbons in the formation. It is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Techniques for making microresistivity measurements of a subterranean formation are well known in the prior art for both wireline and LWD operations. Microresistivity logging tools commonly make use of one of two known measurement principles depending upon whether conductive (water based) or non-conductive (oil based) drilling fluid (mud) is being used. When conductive drilling fluid is utilized, the borehole annulus provides a good conduit for electrical current. One of the primary challenges is to focus the electrical current so that it enters the formation. The use of non-conductive drilling fluid poses different challenges. An oil based drilling fluid can severely impede the flow of electrical current through the fluid into the formation. One significant challenge is in causing the electrical current to penetrate the drilling fluid so that it enters the formation.

Those of skill in the art will understand that oil based drilling fluid is commonly utilized when drilling through water soluble formations (e.g., including salt layers). The use of oil based (non-conductive) drilling fluid is known to greatly reduce the effectiveness of microresistivity logging tools configured for use with water based (conductive) drilling fluid. Likewise, it is generally known in the art that microresistivity logging tools configured for use with oil based drilling fluid (e.g., as described in the preceding paragraph) are not well suited for making microresistivity measurements in conductive drilling fluid.

Microresistivity sensors configured for use with non-conductive drilling fluid commonly include at least four electrodes: including a pair of spaced potential electrodes deployed between current injector and return electrodes. In use, a high frequency alternating current (e.g., on the order of 1 megahertz) is passed between the injector and return electrodes. A high frequency is typically required so as to reduce the electrical impedance of the oil based drilling fluid and enable a portion of the current to penetrate the formation. The use of high frequencies is also known to cause displacement currents in the sensor and in the non-conductive drilling fluid. In the absence of these displacement currents (or when the displacement currents have been accounted for), the voltage drop between the potential electrodes tends to be approximately proportional to the resistivity of the formation.

While four-electrode configurations can be utilized in nonconductive drilling fluid, there remain significant difficulties in logging while drilling applications. For example, drilling operations make it difficult to maintain close proximity of the sensor to the borehole wall. Varying sensor standoff can significantly deteriorate the image resolution. Attempts have been made to use flexible or spring loaded pads to better control the sensor standoff, but such configurations are not generally mechanically robust in LWD operations. Therefore, there exists a need in the art for a microresistivity logging tool (and a sensor) that is suitable for use in non-conductive drilling fluid and generally insensitive to sensor standoff.

SUMMARY OF THE INVENTION

Aspects of the present invention are intended to address the above described need for improved microresistivity logging sensors. In one exemplary embodiment, the invention includes a downhole microresistivity logging tool having a microresistivity sensor. The sensor includes a transmitter coil and at least one receiver coil that may be deployed, for example, in the tool body (e.g., in a blade housing portion of the tool body). The transmitter and receiver coils preferably define coil axes that are substantially perpendicular to the longitudinal axis of the logging tool. The transmitter coil is configured to transmit a high frequency alternating current radially outward through a nonconductive drilling fluid into an adjacent subterranean formation. The receiver coil is configured to receive (measure) a voltage response indicative of an apparent formation resistivity. In preferred embodiments of the invention, the receiver coil is deployed internal to and coaxial with the transmitter coil.

Exemplary embodiments of the present invention may advantageously provide several technical advantages. For example, logging tools in accordance with the present invention may be advantageously enable microresistivity measurements of a subterranean formation in the presence of nonconductive drilling fluid. Moreover, as compared to a conventional four-electrode sensor, embodiments of the present invention generally form a considerably smaller current loop such that the self inductance affect of the current loop on the microresistivity measurement tends to be significantly reduced. Embodiments of the invention also tend to be advantageously less sensitive to censor standoff than conventional four-electrode sensors. A further advantage of the present invention over conventional four-electrode sensors is that the transmitting and receiving conductors are not in direct contact with drilling fluids, thus avoiding electrochemical effects that can take place at the exposed surface of the conductor. These effects are known to typically increase the impedance of the conductor. As a result of the foregoing advantages, microresistivity measurements made with sensors in accordance with the present invention therefore tend to have increased sensitivity to the true formation resistivity.

In one aspect the present invention includes a downhole microresistivity logging tool. The tool includes a transmitter coil and a receiver coil deployed on a logging tool body. The transmitter coil includes an electrical conductor wound about a magnetically permeable core. The electrical conductor is connected to a high frequency alternating current generator deployed in the tool body. The receiver coil also includes an electrical conductor wound about a magnetically permeable core, the electrical conductor being connected to a high frequency alternating voltage sensor deployed in the tool body. Each of the transmitter and receiver coils defines a coil axis that is substantially perpendicular to the longitudinal axis of the tool body.

In yet another aspect, the present invention includes a microresistivity logging while drilling tool. The logging while drilling tool includes a microresistivity logging sensor deployed on a logging while drilling tool body. The microresistivity sensor includes a transmitter coil and a receiver coil, each of which defines a coil axis that is substantially perpendicular to the longitudinal axis of the tool body. The transmitter coil includes an electrical conductor wound about a magnetically permeable core, the electrical conductor being connected to a high frequency alternating current generator deployed in the tool body. The receiver coil includes an electrical conductor wound about a magnetically permeable core, the electrical conductor being connected to a high frequency alternating voltage sensor deployed in the tool body.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
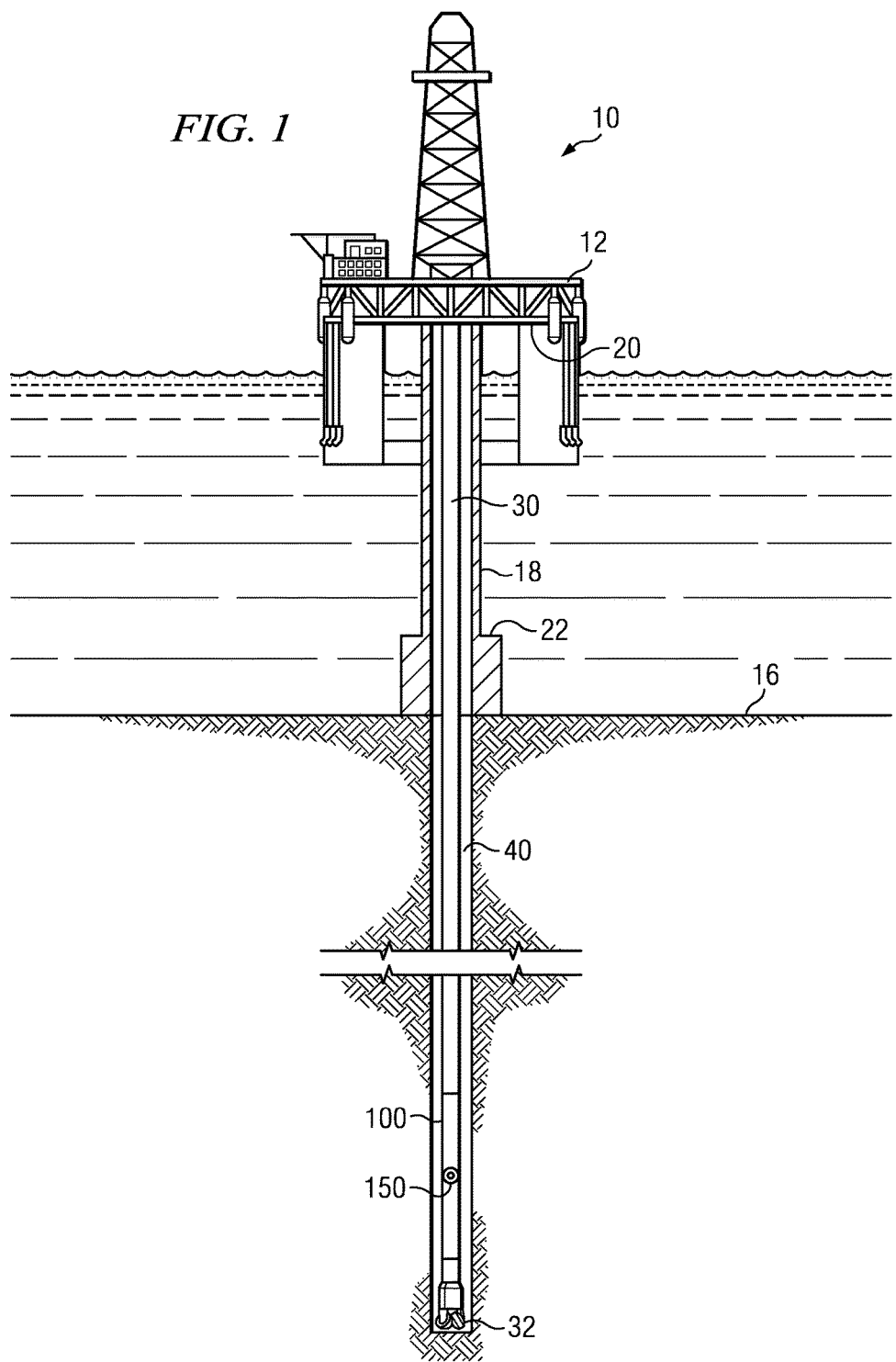
FIG. 1 depicts a conventional drilling rig on which exemplary embodiments of the present invention may be utilized.

Referring now to FIG. 1 through 7, exemplary embodiments of the present invention are depicted. With respect to FIG. 1 through 7, it will be understood that features or aspects of the embodiments illustrated may be shown from various views. Where such features or aspects are common to particular views, they are labeled using the same reference numeral. Thus, a feature or aspect labeled with a particular reference numeral on one view in FIG. 1 through 7 may be described herein with respect to that reference numeral shown on other views.

FIG. 1 depicts one exemplary embodiment of a microresistivity logging while drilling tool 100 in use in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and logging while drilling tool 100. Embodiments of LWD tool 100 include at least one microresistivity sensor 150. Drill string 30 may further include, for example, a downhole drill motor, a mud pulse telemetry system, a steering tool, and/or one or more of numerous other MWD and LWD sensors for sensing downhole characteristics of the borehole and the surrounding formation. The invention is not limited by the drilling string or bottom hole assembly (BHA) configuration.

It will be understood by those of ordinary skill in the art that the deployment depicted on FIG. 1 is merely exemplary for purposes of describing the invention set forth herein. It will be further understood that logging tools in accordance with the present invention are not limited to use with a semisubmersible platform 12 as illustrated on FIG. 1. Measurement tool 100 is equally well suited for use with any kind of subterranean drilling operation, either offshore or onshore. While measurement tool 100 is shown coupled with drill string 30 on FIG. 1, it will also be understood that the invention is not limited to LWD embodiments, but may also be utilized in wireline microresistivity tools.

Figure 2:
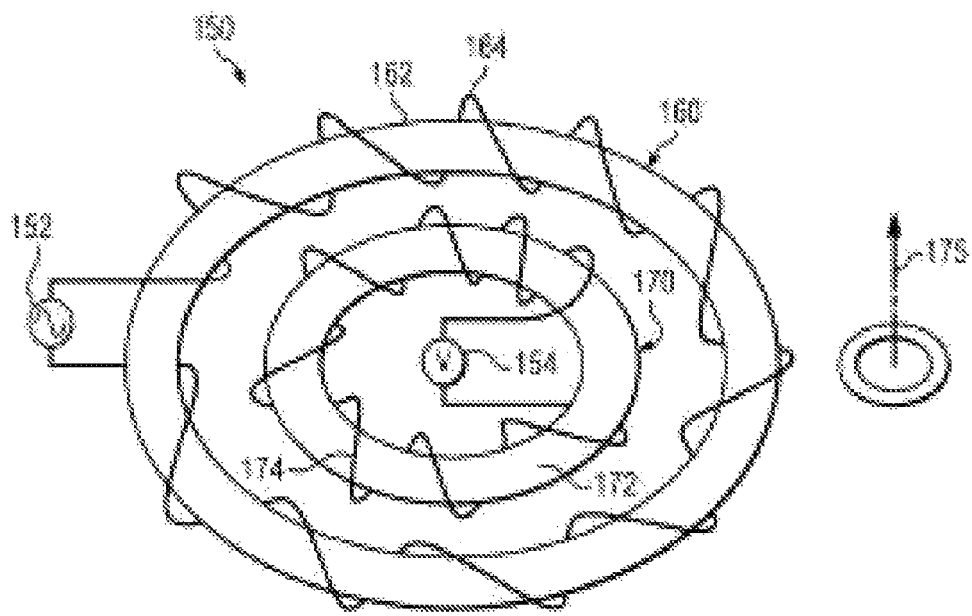
FIG. 2 depicts one exemplary embodiment of a microresistivity sensor in accordance with the present invention.

FIG. 2 depicts one exemplary embodiment of a microresistivity imaging sensor 150 in accordance with the present invention. Sensor 150 includes first and second concentric wound toroidal coils 160 and 170. In the exemplary embodiment depicted the outer toroidal coil 160 is configured as a transmitter (and is also referred to herein as a transmitter coil) while the inner toroidal coil 170 is configured as a receiver (and is also referred to herein as a receiver coil). While the invention is not limited in this regard, such a configuration in which the receiver is concentric in the transmitter is preferred in that it tends to provide for improved image resolution. Each of the first and second coils defines a coil axis 175 (the axis erpendicular to the plane of the coil) that is preferably approximately perpendicular to the longitudinal axis of the tool 100 (e.g., within about 10 degrees). The first and second coils are preferably also deployed in the same plane although one may be recessed with respect to the other.

Sensor 150 may include substantially any suitable transmitter and receiver coil configuration. Each of the coils 160 and 170 includes a magnetically permeable core 162 and 172 having electrically conducting winding 164 and 174 deployed there about. Each coil 160 and 170 typically includes many hundreds or even thousands of turns of conductor, with the conductors being connected to an alternating current generator 152 (for the transmitter) or AC voltage sensing electronics 154 (for the receiver). Such toroidal coil construction is well known the prior art.

It will be understood that the invention is not limited to embodiments in which the transmitter and receiver coils 160 and 170 make use of a toroidal-shaped core. On the contrary, the core may be substantially any shape provided it is convex. Suitable examples of convex core shapes include triangular, rectangular, hexagonal, octagonal, oval, and the like. Non-convex core shapes (e.g., star shaped) are typically not suitable. While a toroidal core is not required, its use can be advantageous in that a toroidal core is symmetric about its central axis. Such symmetry generally provides for isotropic image resolution, i.e., image resolution that is substantially the same in the vertical and azimuthal directions.

In the exemplary embodiment depicted on FIG. 2 the transmitter coil is configured to drive a high frequency alternating current into the surrounding formation, e.g., in the frequency range from about 100 kHz to about 100 MHz. The receiver coil 170 is configured to detect the current entering the formation through the center of the receiver coil 170 by monitoring the voltage output of the coil. The formation resistivity adjacent the receiver coil 170 may then be calculated, for example, via the following equation:

$$R_a = k \frac{V}{I} \qquad \text{Equation 1}$$

where $R_a$ represents the apparent formation resistivity, k represents a geometrical factor, V represents the measured voltage at the receiving coil, and I represents the drive current in the transmitter winding.

It will be understood by those of skill in the art that the magnetic (inductive) coupling between the transmitter and receiver coils is advantageously minimal since the induced magnetic flux is substantially fully contained in the magnetically permeable core. As such the mutual inductance between the transmitter and receiver is generally small. The magnetic pickup between the transmitter and receiver is also therefore generally small, although low-level magnetic pickup may result from an imperfect winding and/or through an entrance/exit port of the coil. While the magnetic coupling is minimal, concentric transmitter and receiver coils typically have a large electrical (capacitive) coupling.

Figure 3:
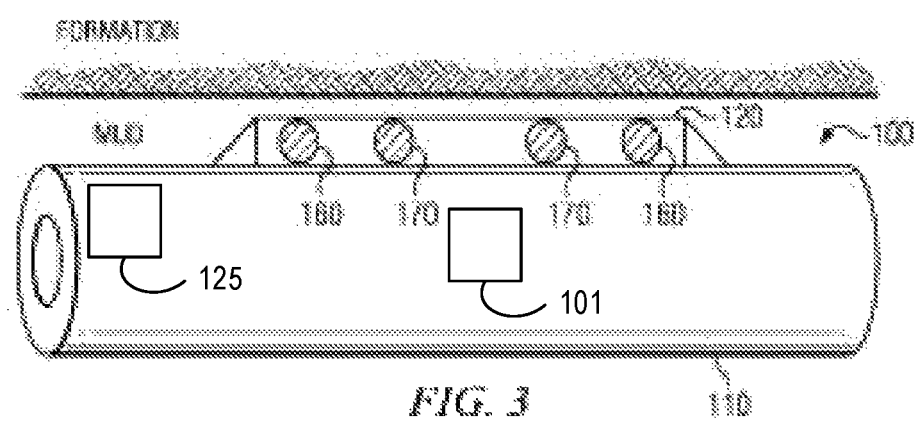
FIG. 3 depicts the microresistivity sensor shown on FIG. 2 deployed in an exemplary microresistivity tool in accordance with the present invention.

FIG. 3 depicts a partial cross-sectional view of a portion of LWD tool 100. In the exemplary embodiment depicted, the transmitter and receiver coils 160 and 170 are deployed in a blade 120 (e.g., a stabilizer blade). Such a deployment advantageously locates the transmitter and receiver coils in close proximity to the borehole wall (as depicted). Those of ordinary skill in the art will readily appreciate that conventional wear bands or wear buttons may be deployed on the blades so as to protect the coils. While not depicted, it will be understood that the transmitter and receiver electronics may be advantageously deployed in close proximity to the coils, for example in the blade or in the tool body just internal to the blade. It will also be understood that the invention is not limited to configurations in which the transmitter and receiver coils are deployed in a blade. The transmitter and receiver coils may be deployed substantially anywhere in the tool body 110.

LWD tool 100 (or drill string 30) may optionally further include an azimuth sensor 101 configured to measure the azimuth angle (also referred to in the art as the toolface angle) of the microresistivity sensor 150 in substantially real time during drilling. Suitable azimuth sensors typically include one or more accelerometers, magnetometers, and/or gyroscopes and are well known in the art. It will be understood that the invention is not limited to any particular azimuth sensor configuration or even to the use of an azimuth sensor.

LWD tool 100 (or drill string 30) may further optionally include a conductivity sensor (not shown) configured to measure an electrical conductivity (or resistivity) and/or dielectric constant of the drilling fluid (e.g., while drilling). The invention is not limited to any particular conductivity sensor as suitable conductivity sensors are known in the art or even to the use of a conductivity sensor.

LWD tool 100 (or drill string 30) may still further optionally include a standoff sensor, for example, including an ultrasonic-based standoff sensor or a caliper-based standoff sensor. Such a standoff sensor may be configured to record the standoff distance between the microresistivity sensor in the borehole wall during drilling. Sensor standoff values may be used to correct for any standoff effects in the measured at microresistivity data. Again, the invention is not limited to any particular standoff sensor configuration or even to the use of a standoff sensor or standoff correction algorithms.

Figure 4A:
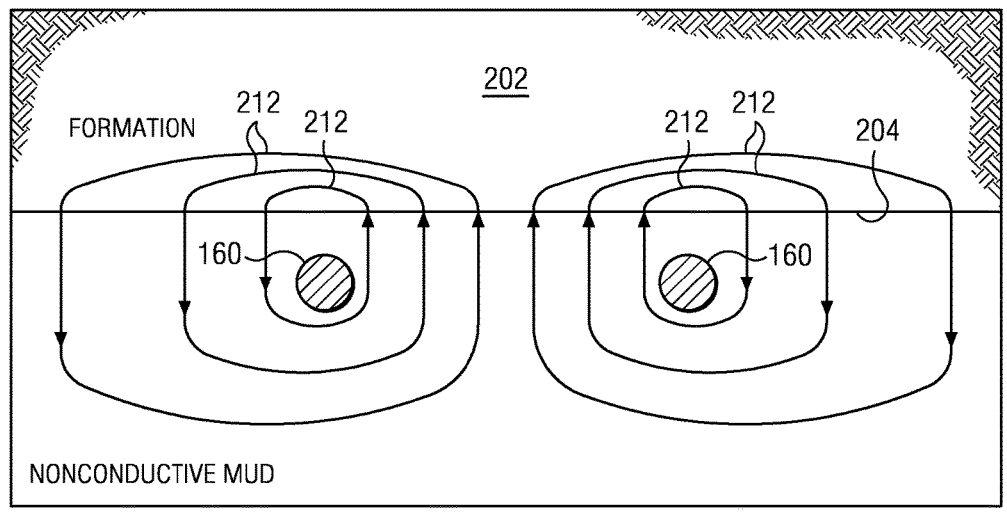
FIGS. 4A and 4B schematically depict current flow induced in a subterranean borehole and formation by a toroidal transmitter.
Figure 4B:
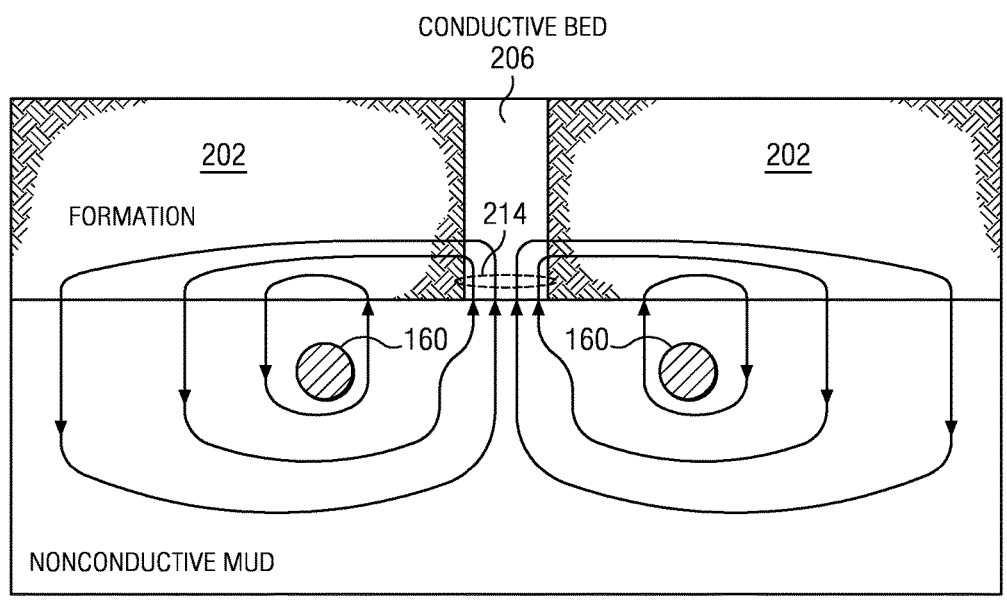

FIGS. 4A and 4B schematically depict the current flow induced by a toroidal transmitter 160 located in proximity to a substantially uniform conductive formation 202. For simplicity, the metallic tool body upon which the coil is typically mounted has been omitted. The receiver coil has also been omitted for simplicity. Owing to the skin effect, electrical currents in the formation tend to be concentrated near the borehole wall 204 (as depicted at 212 of FIG. 4A). Since the formation is significantly more conductive than the drilling fluid (when oil-based drilling fluid is utilized), the electrical current tends to enter the formation substantially perpendicularly to the borehole wall. This current focusing property advantageously tends to obviate the need for incorporating additional focusing mechanisms into LWD tool 100.

In the presence of a conductive thin bed 206, the current pattern tends to change as depicted on FIG. 4B. Owing to the high conductivity of the thin bed 206 (as compared to the bulk formation 202), the current density in the thin bed is greater than other regions of the formation (as depicted at 214). During a microresistivity measurement a current maximum is detected in the receiver coil when the toroidal axis is adjacent to the conductive thin bed. The measured electrical current will tend to decrease on either side of the conductive bed 206 to the value of the bulk formation 202.

Figure 5:
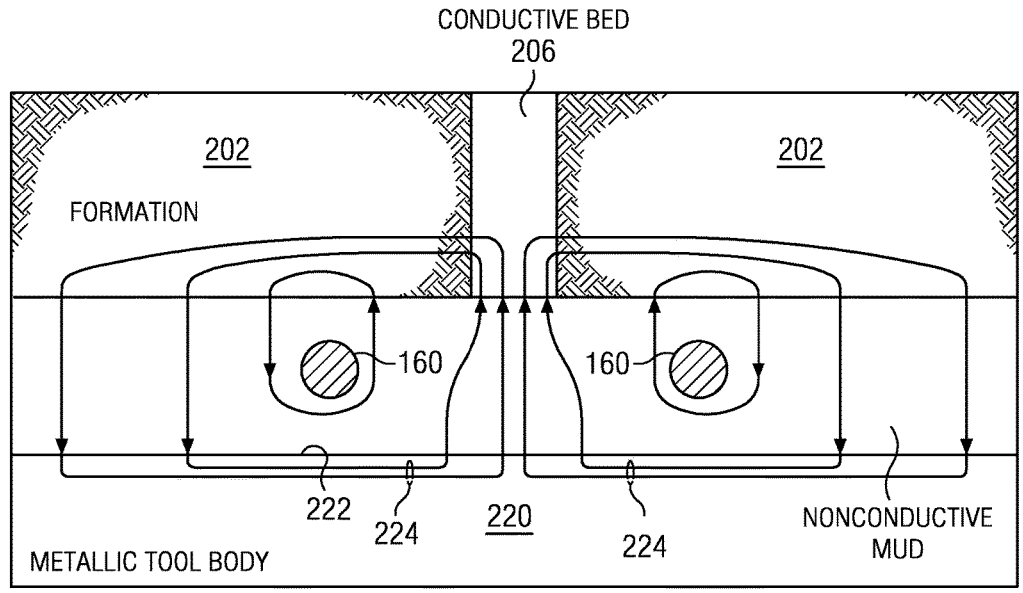
FIG. 5 schematically depicts current flow in a subterranean borehole and formation by a toroidal transmitter in the presence of a conductive tool body.
Figure 6:
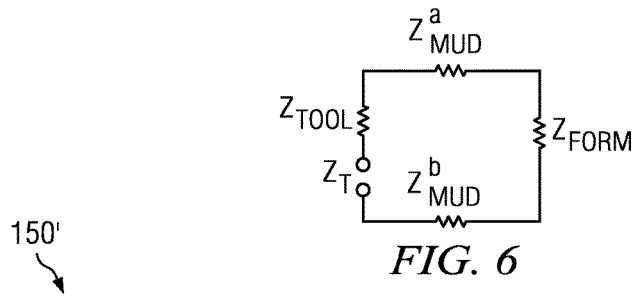
FIG. 6 depicts an equivalent circuit representation of a arrangement shown on FIG. 5.

FIG. 5 is similar to FIG. 4B with the exception that a conductive (metallic) tool body 220 as depicted. Owing to the high electrical conductivity of the tool body 220, electrical currents tend to flow along the surface 222 of the tool body 220 as depicted at 224. This in turn further focuses the electrical current lines between the borehole wall and the tool body such that they are substantially perpendicular to the borehole wall. As such, the conductive tool body 220 may be thought of as providing a current focusing mechanism. The overall current pattern on the formation side tends to remain similar (or substantially identical) that described above with respect to FIG. 4B.

Moreover, as depicted on the equivalent circuit representation shown on FIG. 5, the conductive tool body is electrically in series with the formation. The measured total impedance may therefore be expressed mathematically, for example, as follows:

$$Z_T = Z_{mud}^a + Z_{mud}^b + Z_{Form} + Z_{Tool} \quad \text{Equation 2}$$

where $Z_T$ represents the total measured in impedance, $Z_{mud}^a$ and $Z_{mud}^b$ represent the impedance of the drilling fluid for the radially inward and outwardly directed current, $Z_{Form}$ represents the formation in impedance, and $Z_{Tool}$ represents the tool impedance. Since the tool body is generally metallic and therefore highly conductive, the tool body impedance is generally insignificant with respect to the drilling fluid and formation impedances. As such, the presence of the tool body typically has little effect on the sensor's ability to detect formation resistivity such as the conductive thin beds depicted on FIGS. 4B and 5.

Figure 7:
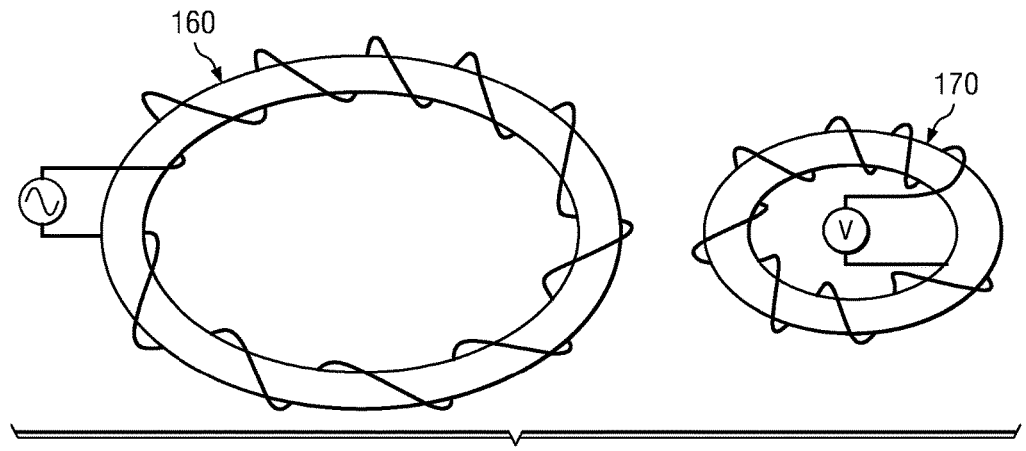
FIG. 7 depicts an alternative microresistivity sensor embodiment in accordance with the present invention.

It will be understood that the invention is not limited to tool embodiments in which the transmitter coil and the receiver coil are coaxial as described above with respect to FIG. 2. In alternative embodiments of the invention the transmitter and receiver coils may be offset such that they do not share a common center. FIG. 7 depicts an exemplary microresistivity sensor embodiment 150' in which the receiver coil 170 is deployed both off-center and outside the transmitter coil 160. In such embodiments multiple receiving coils may be deployed about the transmitter coil so as to enable formation resistivity to be measured across a larger region of the formation.

With reference again to FIG. 3, LWD tool 100 commonly includes one or more an electronic controllers 125 including various control circuitry. The controller 125 includes a high frequency AC generator connected to the transmitter for transmitting a high frequency current into the borehole. The controller 125 further includes high frequency AC voltage sensing electronics connected to the receiver. Such transmitting and receiving electronics configurations are well-known in the art and are not described further herein. The transmitting and receiving electronics may be configured to transmit and receive a single high-frequency signal or a signal including a plurality of frequency components. Again such configurations are well known.

A suitable controller typically includes a programmable processor (not shown), such as a microprocessor or a microcontroller, and may also include processor-readable or computer-readable program code embodying logic, including instructions for controlling the function of the tool. A suitable controller may be utilized, for example, to make microresistivity measurements while drilling. As such the controller may further be configured to: (i) energize the transmitter and thereby transmit a high frequency AC signal into a subterranean formation; (ii) receive the high frequency AC signal at the receiver; and (iii) compute at least one quantity at least partially related to the formation resistivity (e.g., an apparent formation resistivity) from the received signal.

A suitable controller 300 may also be configured to construct LWD microresistivity images of the subterranean formation. In such imaging applications, the microresistivity measurements may be acquired and correlated with corresponding azimuth measurements (obtained, for example, from the directional sensors deployed in the tool 100) while the tool rotates in the borehole. As such, the controller may therefore include instructions for temporally correlating LWD sensor measurements with sensor azimuth (toolface) measurements. The LWD sensor measurements may further be correlated with depth measurements. Borehole images may be constructed using substantially any known methodologies, for example, including conventional binning, windowing, or probability distribution algorithms. U.S. Pat. No. 5,473,158 discloses a conventional binning algorithm for constructing a borehole image. Commonly assigned U.S. Pat. No. 7,027,926 to Haugland discloses a technique for constructing a borehole image in which sensor data is convolved with a one-dimensional window function. Commonly assigned U.S. Pat. No. 7,558,675 to Sugiura discloses an image constructing technique in which sensor data is probabilistically distributed in either one or two dimensions. Commonly assigned, commonly invented, and co-pending U.S. patent application Ser. No. 12/651,040 to Wang discloses an image constructing technique in which logging sensor measurements residing in each of a plurality of azimuthal windows are fit with corresponding mathematical fitting functions.

A suitable controller may also optionally include other controllable components, such as other sensors, data storage devices, power supplies, timers, and the like. As described above, the controller is disposed to be in electronic communication with the various sensors deployed in the drilling system. The controller may also optionally be disposed to communicate with other instruments in the drill string, such as telemetry systems that further communicate with the surface or a steering tool (e.g., for a closed loop geosteering drilling operation). Such communication can significantly enhance directional control while drilling. A controller may further optionally include volatile or non-volatile memory or a data storage device for downhole storage of measured currents, measured voltage drops, microresistivity values, and/or LWD images. The invention is not limited in these regards.

Although the present invention and its advantages have been described in detail, it should be understood that various changes, substitutions and alternations can be made herein without departing from the spirit and scope of the invention as defined by the appended claims.

I claim:

1. A downhole microresistivity logging tool comprising:
a logging tool body having a longitudinal axis;
a transmitter coil deployed in the tool body, the transmitter coil including an electrical conductor wound about a magnetically permeable core, the electrical conductor being connected to a high frequency alternating current generator deployed in the tool body; and
a receiver coil deployed in the tool body, the receiver coil including an electrical conductor wound about a magnetically permeable core, the electrical conductor being connected to a high frequency alternating voltage sensor deployed in the tool body,
wherein the transmitter and receiver coils each define a coil axis that is substantially perpendicular to the longitudinal axis of the tool body,
wherein the receiver coil and the transmitter coil are deployed in the same plane, and
wherein the receiver coil is deployed within and coaxial with the transmitter coil.

2. The downhole tool of claim 1, wherein each of the transmitter and receiver coils includes a substantially toroidal-shaped magnetically permeable core.

3. The downhole tool of claim 1, wherein the transmitter coil is configured to transmit an alternating current in the frequency range from about 100 kHz to about 100 MHz.

4. The downhole tool of claim 1, wherein the logging tool body comprises a radially extending blade, the transmitter coil and the receiver coil being deployed in the blade.

5. The downhole tool of claim 1, further comprising a controller configured to (i) energize the transmitter coil and thereby transmit a high frequency AC signal into a subterranean formation; (ii) receive the high frequency AC signal at the receiver coil; and (iii) compute an apparent formation resistivity from the received signal.

6. A microresistivity logging while drilling tool comprising:
- a logging while drilling tool body having a longitudinal axis;
- a microresistivity logging sensor deployed on the tool body, the microresistivity sensor including a transmitter coil and a receiver coil, each of which defines a coil axis that is substantially perpendicular to the longitudinal axis of the tool body;
- the transmitter coil including an electrical conductor wound about a magnetically permeable core, the electrical conductor being connected to a high frequency alternating current generator deployed in the tool body; and
- the receiver coil including an electrical conductor wound about a magnetically permeable core, the electrical conductor being connected to a high frequency alternating voltage sensor deployed in the tool body,
- wherein the receiver coil and the transmitter coil are deployed in the same plane, and
- wherein the receiver coil is deployed within and coaxially with the transmitter coil.

7. The logging while drilling tool of claim 6, wherein each of the transmitter and receiver coils includes a substantially toroidal-shaped magnetically permeable core.

8. The logging while drilling tool of claim 6, wherein the transmitter coil is configured to transmit an alternating current in the frequency range from about 100 kHz to about 100 MHz.

9. The logging while drilling tool of claim 6, wherein the logging tool body comprises a radially extending blade, the transmitter coil and the receiver coil being deployed in the blade.

10. The logging while drilling tool of claim 6, further comprising an azimuth sensor deployed in the tool body and configured to measure a toolface angle of the receiver coil.

11. The logging while drilling tool of claim 10, further comprising a controller configured to temporally correlate microresistivity measurements with measured toolface angles and thereby construct an LWD image.

12. The logging while drilling tool of claim 6, further comprising a controller configured to (i) energize the transmitter coil and thereby transmit a high frequency AC signal into a subterranean formation; (ii) receive the high frequency AC signal at the receiver coil; and (iii) compute an apparent formation resistivity from the received signal.

13. A method for making microresistivity logging measurements in a subterranean borehole, the method comprising:
- (a) providing a microresistivity logging tool, the tool including a microresistivity logging sensor deployed on a tool body, the sensor including a transmitter coil and a receiver coil, each of which defines a coil axis that is substantially perpendicular to a longitudinal axis of the tool body; each of the transmitter and receiver coils including an electrical conductor wound about a magnetically permeable core;
- (b) causing the transmitter coil to transmit a high frequency alternating current into the subterranean borehole;
- (c) causing the receiver coil to measure a high frequency alternating voltage corresponding to said transmitted alternating current in (b); and
- (d) computing an apparent formation resistivity from the alternating voltage received in (c),
- wherein the receiver coil and the transmitter coil are deployed coaxially and in the same plane, with the receiver coil being deployed within the transmitter coil.

* * * * *